Patented May 29, 1923.

1,456,781

UNITED STATES PATENT OFFICE.

JOHANNES M. KESSLER, OF WEST ORANGE, AND VIRGIL B. SEASE, OF NEWARK, NEW JERSEY, ASSIGNORS TO E. I. DU PONT DE NEMOURS & COMPANY, OF WILMINGTON, DELAWARE, A CORPORATION OF DELAWARE.

PROCESS OF RECOVERING CELLULOSE ACETATE FROM SOLUTIONS THEREOF.

No Drawing. Application filed May 14, 1919. Serial No. 297,167.

*To all whom it may concern:*

Be it known that we, JOHANNES M. KESSLER and VIRGIL B. SEASE, citizens of Germany and the United States, respectively, and residents of West Orange and Newark, respectively, in the county of Essex and State of New Jersey, have invented a certain new and useful Process of Recovering Cellulose Acetate from Solutions Thereof, of which the following is a specification.

This invention relates to a process of recovering cellulose acetate from solutions thereof, and comprises forcing said solutions through small orifices into a liquid capable of precipitating the cellulose acetate in said solutions. More particularly, our new process comprises squirting into an organic liquid, such as ether, the cellulose acetate solutions which result from the acetylation of cellulose with a mixture of acetic acid, acetic anhydride and sulfuric acid.

The usual practice for precipitating cellulose acetate from the reaction mixtures obtained in the acetylation of cellulose, is to introduce a large volume of water into said reaction mixtures. A disadvantage of working in this way is that the cellulose acetate is precipitated in the form of lumps of various sizes, requiring prolonged washing and pulping to purify the larger lumps. Another disadvantage is that in mixing a solution of cellulose acetate with water a certain amount of the product is lost in the wash waters by the pulping process, due to the fact that there are apt to be formed very fine particles which float away with the wash waters.

The object of our invention is to avoid the above disadvantages and to facilitate the washing and purifying of the cellulose acetate.

We have discovered that the manner of precipitation has an appreciable effect upon the properties of the cellulose acetate, and that squirting through small orifices into a precipitating bath furnishes an excellent means of standardizing the operation and producing a cellulose acetate of uniform quality.

In carrying out our new process, an acetic acid solution of cellulose acetate, having any of the usual solubilities, is forced by pressure through a filter screen and then through small orifices into a precipitating liquid, whereby the cellulose acetate is precipitated in the form of filaments. In case the cellulose acetate solution used as a crude solution containing a mineral acid, such as sulfuric acid, which will ordinarily be the case when such acid is used as the acetylating catalyst, the mineral acid may be first neutralized by adding to the solution an organic or inorganic base, such as an alkali-metal hydroxide or certain salts, such as sodium acetate, etc., in quantities sufficient to convert the sulfuric acid to a salt. The filaments of cellulose acetate are then separated from the surrounding liquid, and the latter is treated to separate the acetic acid.

The precipitating liquid may be water, but we prefer to use an organic liquid, and have found that ethyl ether affords certain advantages as a precipitant. We may use, however, other precipitants such as solvent naphtha, benzene, carbon tetrachloride and alcohol, depending upon the solubility of the cellulose acetate to be precipitated. Where it is desired to recover the acetic acid, the precipitant should have a boiling point differing materially from the boiling point of acetic acid, so as to facilitate their separation by distillation. We have found it to be desirable to squirt the cellulose acetate solution into a current of the precipitant, moving at such a rate as to prevent accumulation, in the vicinity of the small orifices, of acetic acid or other solvent in which the cellulose acetate is dissolved. In this way the fine streams of cellulose acetate solution come in contact with a precipitating mixture of uniform composition. The current of precipitating liquid also serves to thoroughly wash the filaments, so that when the latter are removed from the liquid they are substantially free from acetic acid or other solvent in which the cellulose acetate was dissolved.

We claim:

1. The process which comprises forcing a solution of cellulose acetate through small orifices into an ether to precipitate said cellulose acetate.

2. The process of recovering cellulose acetate from a solution thereof which comprises forcing said solution through small orifices into ethyl ether, and separating the resulting filaments of cellulose acetate from the surrounding liquid.

3. The process of recovering cellulose acetate from a solution thereof which comprises forcing said solution through small orifices into a current of an ether moving at such a rate as to prevent accumulation in the vicinity of said orifices of the solvent in which the cellulose acetate is dissolved, and separating the resulting filaments of cellulose acetate from the surrounding liquid.

4. The process of recovering cellulose acetate from an acetic acid solution thereof which comprises forcing said solution through small orifices into ethyl ether, withdrawing the resulting filaments of cellulose acetate from the mixture of ether and acetic acid, and then separating the acetic acid from the ether.

5. The process of recovering cellulose acetate from a crude solution thereof in an organic solvent containing a mineral acid which comprises first neutralizing the mineral acid, then forcing the resulting solution through small orifices into a liquid capable of precipitating cellulose acetate in the form of an irregular mass of filaments, and separating the resulting mass of cellulose acetate filaments from the surrounding liquid.

6. The process of recovering cellulose acetate from a solution thereof in a mixture of acetic and sulfuric acids which comprises first neutralizing the sulfuric acid, then forcing the resulting solution through small orifices into ethyl ether, and separating the resulting precipitated cellulose acetate from the surrounding liquid.

In testimony whereof we affix our signatures.

JOHANNES M. KESSLER.
VIRGIL B. SEASE.